United States Patent [19]
Bennett, Jr. et al.

[11] 3,972,156
[45] Aug. 3, 1976

[54] SPEED-INDEPENDENT STATIC MAGNETIC FIELD METAL DETECTOR

[75] Inventors: Clarence L. Bennett, Jr., Groton; Carl E. Bohman, Sudbury, both of Mass.

[73] Assignee: Sperry Rand Corporation, New York, N.Y.

[22] Filed: Feb. 24, 1975

[21] Appl. No.: 552,387

[52] U.S. Cl............................ 56/10.2; 130/27 JT; 324/41; 340/258 B; 56/DIG. 15
[51] Int. Cl.² ...................................... A01D 69/10
[58] Field of Search............. 56/10.2, DIG. 15, 344, 56/13.4; 130/27 JT; 324/41; 340/258 B

[56] References Cited
UNITED STATES PATENTS

| | | | |
|---|---|---|---|
| 3,530,650 | 9/1970 | Phillips | 56/2 |
| 3,597,755 | 8/1971 | Parkin | 340/258 |
| 3,697,972 | 10/1972 | Brown | 324/41 X |
| 3,757,501 | 9/1973 | Bennett, Jr. et al | 56/10.2 |
| 3,758,849 | 9/1973 | Susman et al | 324/41 |
| 3,889,249 | 6/1975 | Bennett, Jr. et al. | 340/258 |

*Primary Examiner*—Russell R. Kinsey
*Attorney, Agent, or Firm*—Howard P. Terry

[57] ABSTRACT

A static magnetic field detector for harvesting machines senses the passage of ferrous or magnetic objects utilizing a balanced magnetic field excitation configuration which provides substantial self-cancellation of spurious background signals. A novel filtering means provides normalization of the fluctuations in the background noise due to the variations in the angular velocity of the rotating harvesting machine components. Additionally, the detector apparatus is disposed within a compressor feed roll of the machine thereby reducing the area which must be scanned and increasing the sensitivity of the device.

10 Claims, 5 Drawing Figures

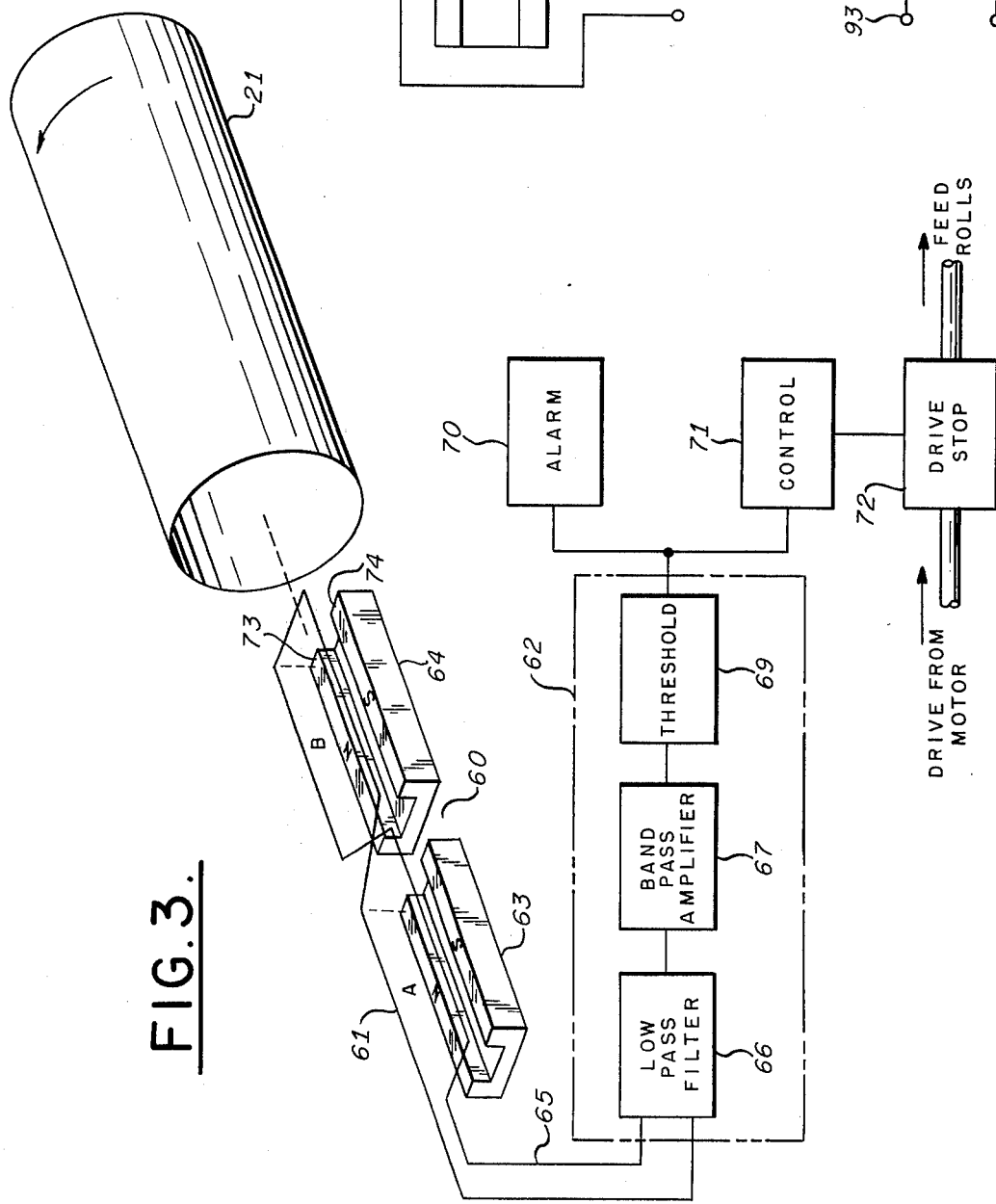
FIG.3.
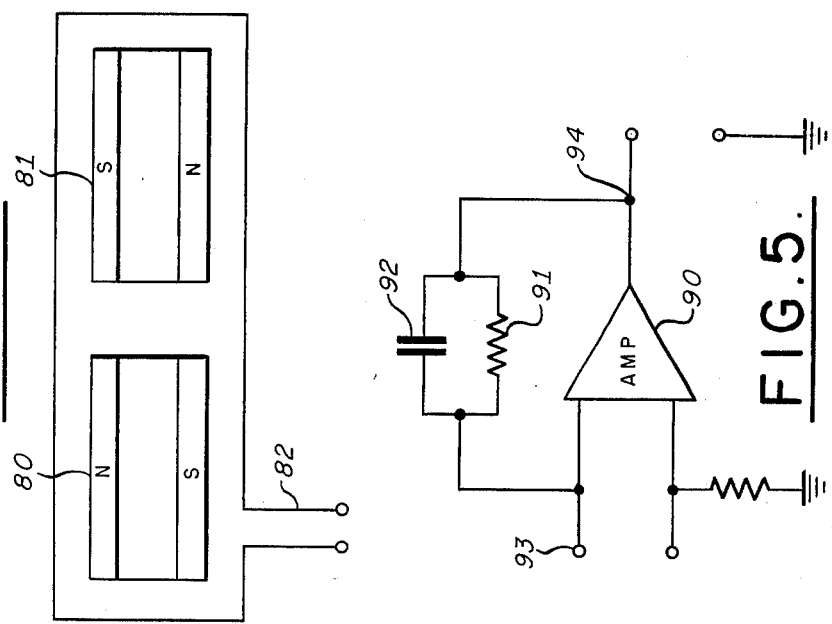
FIG.4.
FIG.5.

SPEED-INDEPENDENT STATIC MAGNETIC FIELD METAL DETECTOR

BACKGROUND OF THE INVENTION

1. Field of the Invention

The invention pertains to apparatus for detecting the presence of objects composed, at least in part, of ferrous or magnetic materials in harvesting machines.

2. Description of the Prior Art

The subject invention is an improvement over the device disclosed in U.S. Pat. No. 3,757,501 entitled "Static Magnetic Field Metal Detector," issued to Bennett et al, and the following copending applications; Ser. No. 353,853, now U.S. Pat. No. 3,889,249 entitled Static Magnetic Field Metal Detector filed Apr. 23, 1973 in the names of Bennett et al; Ser. No. 373,565 entitled Static Magnetic Field Metal Detector, filed on June 25, 1973 in the name of William L. Garrott, and Ser. No. 529,305 entitled "Apparatus to Detect the Passage of Ferrous Material In Crop Harvesting Machines" filed Dec. 4, 1974 in the name of William L. Garrott, all of the above being assigned to the assignee of the present invention.

Generally, prior art devices, for detecting the presence of magnetic or ferrous objects, which preceded those mentioned in the foregoing paragraph, have one or more disadvantages rendering them of little value in certain applications, especially in reliable protection of expensive machinery from tramp metal, for instance. Prior art bridge devices often operate with excitation frequencies as high as 20 to 100 Kilohertz and are therefore quite susceptible to the presence of moisture, vegetation, the operator, or the like. They impose on the operator the serious burden of continuous monitoring and adjustment of the calibration of the apparatus. Even at relatively lower excitation frequencies, such detectors are adversely affected by moist conditions, thereby rendering them unsuitable for use where high accuracy, reliability and freedom from generation of false alarms is demanded.

Specifically, the apparatus of the aforementioned references, although constituting a significant improvement in the art, are nonetheless subject to some limitations. More particularly, these devices incorporate circuits to compensate for the fluctuations of the background signals which are expensive and not entirely adequate. Furthermore, these devices are disposed in locations which require the detector to supervise a relatively large scan area, reduce the sensitivity of the device and, in many cases, further require a plurality of detectors for a single basic harvesting machine.

SUMMARY OF THE INVENTION

The present invention overcomes the aforementioned limitations in the following manner. Firstly, novel filtering apparatus is utilized which normalizes background noises due to the fluctuations in angular velocity of the rotating machine parts, etc. and which is considerably less expensive than the devices incorporated in the prior art. The background noise varies linearly with variations in the angular velocities of the rotating machine elements with respect to both frequency and amplitude.

The apparatus takes advantage of this linear relationship by integrating the signal over the working spectrum of the harvesting machine producing a substantially flat amplitude response to these noise variations. Secondly, the detector is further simplified by the use of a pair of U-shaped magnets which generate a magnetic field in which a unitary pick-up coil detects fluctuations therein. Finally, the detector has been relocated to within a compressor feed roll thereby reducing the area of the scan, increasing the sensitivity of the device and permitting the use of a single detector in a harvesting machine as opposed to a detector in each attachment.

BRIEF DESCRIPTION OF THE DRAWINGS

FIG. 3 depicts the present invention in schematic-block diagram form and partly in perspective of the disposition of the invention within the harvesting machine;

FIG. 4 illustrates the second embodiment of the invention depicted in FIG. 3; and FIG. 5 is a block-schematic diagram of the low pass filter depicted in FIGS. 3 and 4.

DESCRIPTION OF THE PREFERRED EMBODIMENT

Figure 1:
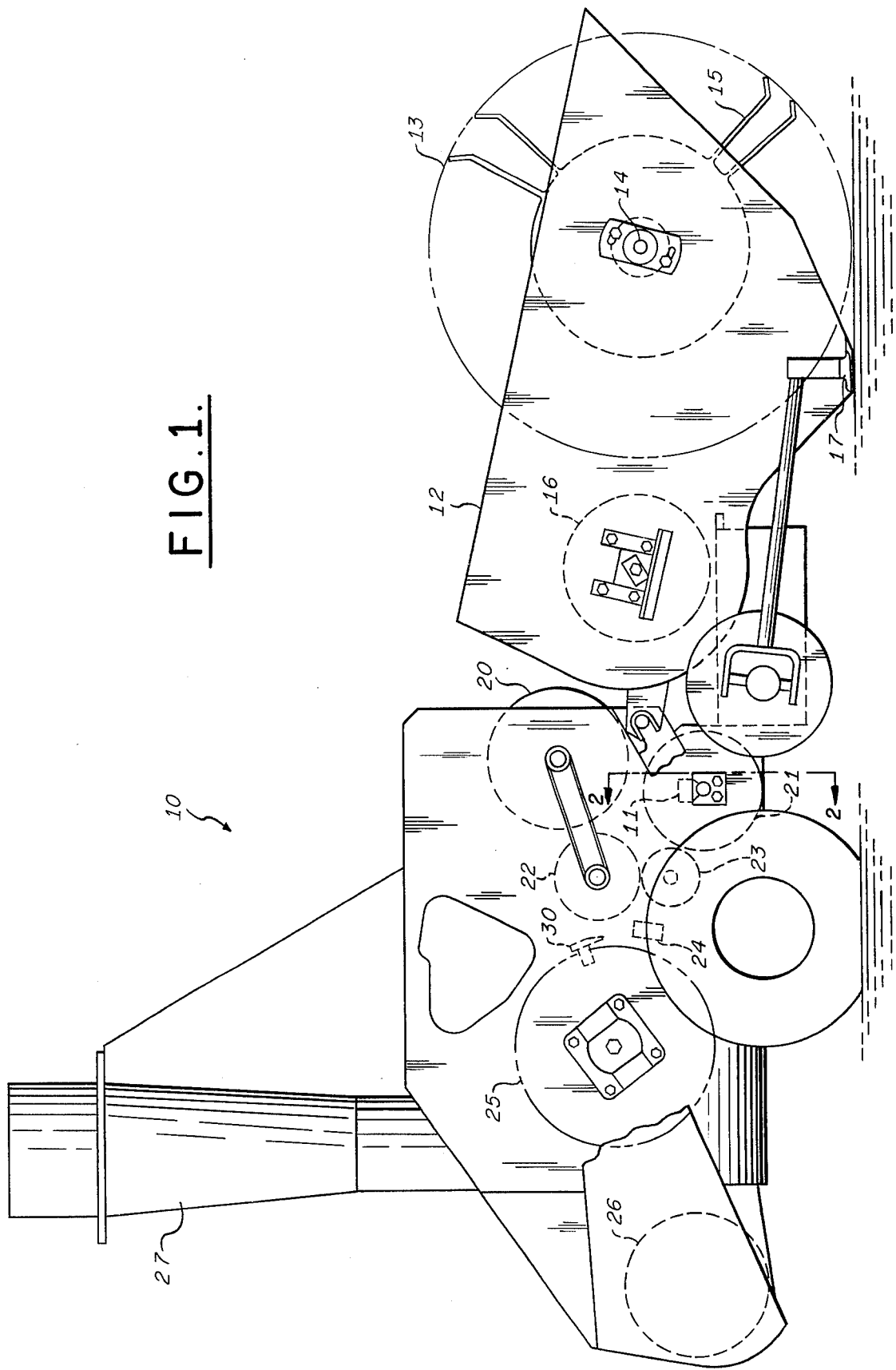
FIG. 1 is a side elevational view, partly in cross-section of a harvesting machine embodying the invention.

FIG. 1 illustrates a harvesting machine 10 in cooperation with the present invention 11. The harvesting machine 10 includes a feeder housing 12 having attached thereto a rotatable reel 13 on a shaft 14 to which are coupled a plurality of radially projecting, laterally spaced, pickup tines or fingers, such as tine 15; and auger 16 and a sickle bar 17. The harvesting machine 10 further includes a pair of forward compressor feed rolls 20 and 21, the latter of which houses the static magnetic field metal detector apparatus 11; a pair of rear compressor feed rollers 22 and 23, a shear bar 24, a cutter assembly 25, a conveyor 26 and a discharge blower 27.

In operation, the crop material to be harvested is cut by sickle bar 17, picked up by the tines of reel 13, and delivered to the forward compressor feed rolls 20 and 21 by the auger 16. The forward feed rolls 20 and 21 in cooperation with the rear feed rollers compress the crop into a mat-like form and transport it to the cutter head 25. Cutter head 25 which is arranged with a plurality of knives or blades, such as blade 30, severs the mat-like crop material into the desired lengths and removes it to the transverse auger 26. Transverse auger 26 transports the severed crop material to a discharge blower 27 wherefrom the crop material is discharged into a wagon or truck (not shown).

During various operations such as sowing, planting, mowing, raking or the like, it is possible for machine parts made of iron or other magnetic materials to break off or simply drop off the farm machine being used without knowledge of the operator and to be lost in the field. Typically, these pieces of tramp metal are composed of magnetic material such as iron, including bolts, pins, rake teeth, idler pulleys, chain links, mower sickle teeth, hand tools, pieces of wire and the like. During use of a crop harvester machine such as that of FIG. 1 for harvesting sorghum, alfalfa or other types of fodder, such pieces of tramp metal may be ingested by the harvester and passed therethrough, causing extensive damage to the harvester machine 11, especially with respect to the cutter blades or knives 30.

To prevent such damage during the critical time of harvesting, it is desired to place a tramp metal detector in the path that the crop travels in moving towards the cutter head 25. The tramp metal detector is placed in a location which provides sufficient time to manually or automatically stop the machine elements before the tramp metal reaches the cutter head 25. In the first three prior art references specifically mentioned the detector is mounted in the floor of the housing 12. This type of positioning permits undesirable objects which may be located on the top of the incoming mat of crop material to go undetected and additionally, creates a situation where each attachment, such as housing 12, must incorporate the detecting device, rather than it being standard equipment in the body of the harvester machine 12. In the present configuration, the detector is positioned within one of the forward compressor feed rollers 21, within the body of the machine 10 thereby substantially reducing the area to be scanned and thus the size of the detector; increasing the sensitivity of the detector 11 such that no undesired objects pass by undetected; and eliminating the duplication of detectors.

Figure 2:
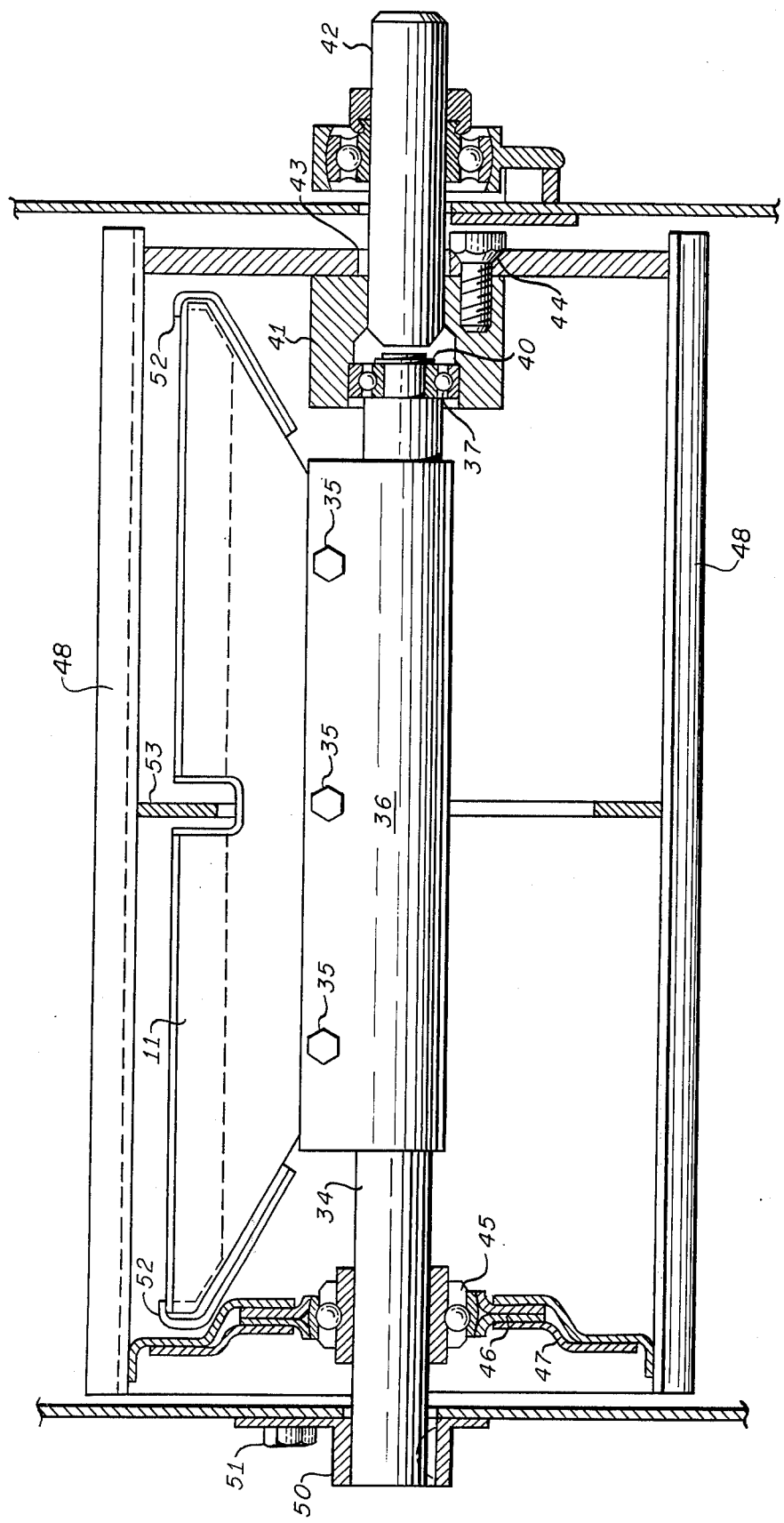
FIG. 2 is a cross-sectional view of the compressor feed roller taken along the section lines 2—2 in FIG. 1 which houses the invention.

As depicted in FIG. 2 the detector 11 is rigidly mounted to stationary shaft 34 by a plurality of bolts 35 which pass through bracket 36 (only one of which is visible in the view depicted in FIG. 2). Prior to its insertion into the feed roll 21, shaft 34 is equipped with ball bearings 37 and a snap ring 40. A collar 41, having a splined stub shaft 42, is then placed over the bearings 37 and the snap ring 40. The stub shaft 42 extends through an opening 43 contained in the inboard or the left side of feed roll 21 and is mechanically coupled to a sprocket in a drive train (not shown) for rotating the feed roll 21. After the shaft 42 is inserted in the opening 43, the collar 41 is secured to the left side wall of the feed roll by wheel bolts 44. The right or outboard end of the feed roll 21 is equipped with ball bearings 45 and a flange 46 therearound. A steel shield 47 is placed on, and secured to, the outside of the flange 46 thereby shielding the outboard end of and the feed roll 21. Finally, mounting plate assembly 50 is placed over the shield 47 and secured in that position by a plurality of bolts 51. Mounting plate assembly 50 contains a collar adapted to permit the insertion of a key with which to secure shaft 34 in a fixed position relative to the feed roll 21. The mounting arrangement just described enables the feed roll 21 to rotate without having shaft 34 rotate, thereby maintaining the detector 11 in a stationary position within the feed roll in close proximity to the corrugated peripheral wall 48 of the feed roll rotating thereby.

In order to prevent the detector 11 from detecting any ferrous objects which may be located on the harvester, shields 52 preferably comprised of pre-formed, cold-rolled steel are disposed along the limits of the detector 11 by any suitable means such as epoxy. Additionally, to prevent the generation of spurious signals by the feed rolls themselves, the forward feed rolls 20 and 21 are constructed of magnetically transparent material, such as stainless steel specially heat-treated to substantially eliminate the magnetic properties therefrom.

The detector 11 as depicted in the FIG. 3 is comprised of a magnetic field generating means, such as a permanent magnet assembly 60, a pickup coil 61 and a signal processing unit 62. Because of a break in the hardware of the feed roll 21 due to the supporting ring 53, as depicted in FIG. 2, it is desirable to fabricate the magnetic field generating means 60 in the form of two elongate permanent magnets 63 and 64 having generally U-shaped cross-sections with polarized arms, such as arms 73 and 74, extending from one surface. The permanent magnets 63 and 64 are lined end to end such that both are polarized in the same sense. A uniform magnetic field is thus generated along the length of the detector which extends from one pole of each magnet 63 and 64, through the magnetically transparent feed roll 21, into the region through which the compressed crop and any tramp metal will pass, and returns to the opposite poles of the magnets 63, 64 through the feed roll 21.

The pickup coil 61, preferably a single, multi-turn coil, is generally rectangular in shape, but is twisted into a figure-8 like shape at the mid-plane between permanent magnets 63 and 64 to form two equal-area coil sections A and B. While sections A and B of pickup coil 61 appear to be laterally offset in the drawing of FIG. 3, they are preferably symmetrically related and intertwined and may be woven around a single coil form about permanent magnets 63 and 64.

The static magnetic field threading section A of the pickup coil 61 produces a total flux $\phi_A$ passing through the region above magnet 63 and similarly, the field threading section B of the pickup coil 61 produces a total flux $\phi_B$ passing through the region above magnet 64. These two fluxes may be made substantially equal to the use of appropriate precision in manufacture. A finite voltage V(t) will be produced at the output 65 of pickup coil 61 only when there is a change of flux passing through pickup coil 61 since:

$$V(t) = N \left[ \frac{d\phi A}{dt} - \frac{d\phi B}{dt} \right] \qquad (1)$$

where N is the number of turns of wire in pickup coil 61. It will be noted that the polarity of the flux associated with section B of pickup coil 61 in the equation is opposite that with respect to section A and it should be apparent that this is due to the crossover of pickup coil 61 at the mid-plane. A pulse is produced when an object passes over the pickup coil 61 in an unsymmetrical position with respect to the mid-plane between magnets 63 and 64 and the pulse is then passed as a useful alarm signal to the output lead 65 to the signal processor 62. Even should the object pass over the mid-plane between the magnets 63 and 64, it will rarely disturb the fields associated with sections A and B of pickup coil 61 in an exactly symmetrical manner, since the usual tramp metal part lacks substantial symmetry and will, in any event, rarely be so oriented so as to pass and create symmetrical disturbances in the fields associated with sections A and B of the magnetic pickup coil 61.

Nevertheless, such a property is distinctly beneficial in the invention, since various parts of the harvesting machine, because of the deliberate placement of the detector 11, have effectively a considerable degree of symmetry about the mid-plane discontinuity between magnet 63 and 64. Thus, rotation of moving parts of the harvester and vibration of the frame and housing thereof produce, in large measure, flux disturbances in pickup coil 61 which are desirably self-cancelling.

Signals signifying the presence of tramp metal as detected by the pickup coil 61 will be directed to the low pass filter 66 via output leads 65. The output of the low pass filter 66 is directed to a band pass amplifier which is, in turn, coupled to a threshold detector 69. If tramp metal is present, an output signal will be generated from the threshold detector 69 and coupled to an alarm indicator 70 and a control circuit 71. The alarm indicator 70 activates a visual and/or audible alarm to alert the operator of the machine as to the presence of tramp metal therein. The control circuit 71 activates a drive stop 72 which interfaces with the machine elements of the harvesting machine thereby causes a cessation of operation of the harvesting machine until the tramp metal can be removed from the machine.

The band pass amplifier 67, similar to that disclosed in U.S. Pat. No. 3,757,501, has a pass band of approximately 10 Hz, with the lower cutoff frequency at approximately 0.5 Hz, since it has been determined that this is the effective frequency spectrum of tramp metal objects. The output response of the pass band amplifier is essentially flat, that is, constant, over the pass band. The pass band, in a typical example, rolls off at a low frequency and at a substantially 12 db per octave and at the high frequency end by substantially 18 db per octave. The pass band characteristics of this circuit thus provide additional attenuation of relatively higher frequency spurious noise signals induced by motion of the various parts of the protected machine. Moreover, the pass band amplifier 67 additionally provides attenuation in excess of 40 db for 50 Hz signals that may be induced by the proximity of electrical power distribution lines. Amplification by the band pass amplifier may be used to raise the signal incoming from the low pass filter 66 from, for example, tens of microvolts to hundreds of millivolts.

In U.S. Pat. No. 3,757,501 and the other references specifically mentioned, the output from the band pass amplifier is necessarily coupled to a circuit which variably adjusts the threshold level of the detector. This is necessitated because of the inherent frequency related variations in the amplitude of the detected signal caused by operating speeds of the equipment. For example, depending on the length of cut of the crop material that the operator desires, the velocity at which the crop material approaches the cutter heat 25 will vary, while the angular velocity of the cutter head 25 remains constant. It was found that the amplitude and frequency characteristic of the background noise detected by the pickup coil 61 increases linearly since, necessarily, the rotating machine elements must rotate at higher angular velocities for increases in the length of cut for the crop material. In the prior art references, attempts were made to either manually set the threshold before each operation or automatically adapt the threshold to variations in the background noise and the velocity of the tramp metal through the machine. The manual approach was obviously prone to error and had the further limitation of requiring constant readjustment. The adaptive threshold method as disclosed in the prior art, although providing more satisfactory operation, is still limited in that it requires the use of expensive components and must be carefully adjusted to provide a time-delayed average signal which raises or lowers the level at which the threshold detector indicates the presence of tramp metal.

The present invention overcomes this difficulty with the utilization of fewer and less expensive components. Specifically, a low pass filter 66 or integrator, which is depicted in FIG. 3 preceding the band pass amplifier 67, is incorporated which integrates the response from the pickup coil 61 over the pass band of band pass amplifier 67. As mentioned previously, spurious magnetic background noise detected by pickup coil 61 varies linearly with the angular velocity of rotating machine elements of the harvester machine 10. The pass band amplifier 67, although satisfactorily cancelling spurious magnetic signals detected outside the band width of the amplifier, has little or no effect on the fluctuations in the output signals of the pickup coil 61 due to variations in the length of cut because, as noted earlier, the response over the pass band is essentially flat. The low pass filter 66 is designed to adequately normalize the linear variations aforementioned. Specifically, the filter is designed with a 3 db point at approximately 1 Hz and a slope of approximately 6 db per octave which provides a relatively constant response to the range of angular velocities of the machine. This substantially constant response to these fluctuations in background noise eliminates the need for adjusting the threshold level. Therefore, the threshold level of the threshold detector 69 can be preadjusted to a fixed value for the entire operating range of the harvesting machine 10.

The preferred embodiment of the low pass filter 66 is depicted in FIG. 5. As shown therein, the filter 66 is comprised of an operational amplifier 90 arranged as a low pass filter or integrator by connecting the parallel combination of a resistor 91 and a capacitor 92 between the inverting input 93 and the output 94. The 3 db point of this circuit is defined by the equation $$f = \frac{1}{2\pi RC} \qquad (2)$$

where R is the resistance of resistor 91 and C is the capacitance of capacitor 92. The input to the low pass filter 66 is defined by $$V(t) = N \frac{d\phi T}{dt} \qquad (3)$$

where $$\phi T = \phi A - \phi B. \qquad (4)$$

The input from the low pass filter 66 is then defined by the equation
$$V_{out}(t) = \int V(t) \qquad (5)$$

and by carrying out the indicated operation on the expression for $V(t)$ provides an output signal of
$$V_{out} = N\phi_T. \qquad (6)$$

Thus an output signal is provided which is proportional to asymmetry in the magnetic flux and independent of the time rate of change of $\phi_T$.

FIG. 4 depicts a second embodiment of the static magnetic field metal detector 11. In FIG. 4, the elongate permanent magnets 80 and 81 are shown aligned end to end with their respective polarities reversed. Additionally, the pickup coil 82 is disposed with a single rectangular section having no crossover point at the mid-plane between the permanent magnets 80 and 81. In this configuration, the magnetic fields generated by the permanent magnets 80 and 81 are of opposite sense and, with appropriate attention to precision fabrication, the voltage detected by pickup coil 82 is identical with that of the previous embodiment and, therefore, may be represented by equation (1).

While the invention has been described in its preferred embodiments, it is to be understood that the words which have been used are words of description rather than limitation and that changes within the purview of the appended claims may be made without departing from the true scope and spirit of the invention in its broader aspects.

We claim:

1. In a static magnetic field detector for protecting rotatable machine elements in harvesting machine that are susceptible to damage by tramp metal, said detector having means for generating a magnetic field and at least one magnetic pickup coil means, apparatus comprising:

lowpass filter means coupled to the output of said pickup coil means and having an attenuation characteristic with a slope substantially equal and opposite to the slope characteristic of the fluctuations in the output signal from the pickup coil means due to variations in the angular velocities of the rotatable machine elements, such that the amplitude of the output signal from said lowpass filter means is maintained substantially constant with respect to said fluctuations in the angular velocities of said rotatable machine elements;

bandpass filter circuit means coupled to said filter means and adjusted to pass the range of signals within a predetermined frequency spectrum for attenuating the response of said pickup coil means to spurious magnetic field variations due to said rotating machine elements and other sources without said predetermined frequency spectrum; and utilization means, coupled to said bandpass circuit means, and responsive to signals indicative of the presence of tramp metal, for stopping the operation of said machine and alerting the operator thereto.

2. The apparatus as described in claim 1 wherein the lowpass filter means is characterized by a 3 db. point adjusted at approximately 1 Hz and a slope of approximately 6 db. per octave.

3. The apparatus as described in claim 2 wherein said low pass filter means comprises:

operational amplifier means having an inverting input and an output,

RC network means comprising a resistor and a capacitor connected in parallel between said inverting input and said output of said operational amplifier means and wherein the values of said resistor and said capacitor are chosen to provide said low pass filter means with a 3 decibel point at approximately 1 Hertz.

4. The apparatus as described in claim 2 wherein the band pass filter circuit means comprises a bandpass filter having a substantially flat response to signals in said predetermined frequency spectrum and wherein said predetermined frequency spectrum is defined by 3 decibel points at approximately 0.5 Hertz and 10 Hertz.

5. The apparatus as described in claim 1 wherein said utilization means includes a threshold detecting means coupled to said band pass circuit means for sensing the level of a signal from said band pass circuit means indicative of the presence of tramp metal within said harvesting machine and wherein the threshold detecting level of said threshold detecting means is preadjusted to a constant value for all of operating conditions of said harvesting machine.

6. The apparatus as described in claim 5 wherein said utilization means further includes:

alarm means coupled to said threshold detecting means and responsive to an output therefrom for indicating to the operator of said harvesting machine the presence of tramp metal therein, activation means, coupled to said threshold detecting means and responsive to an output therefrom for causing the machine elements of said harvesting machine to stop operation when the presence of tramp metal is detected within said harvesting machine.

7. The apparatus as described in claim 1 wherein:

said means for generating a magnetic field comprises a first and second elongate permanent magnet means of substantially equal strength having substantially parallel poles and disposed such that a first and second unidirectional magnetic field of the same sense are generated in discrete proportions of the area in which tramp metal is to be detected, and wherein said magnetic pickup coil means comprises a multiple conductor coil having a first and second sections and disposed in substantially equal stationary relation within said first and second unidirectional magnetic fields, respectively, and having a cross-over conductor means for coupling opposite conductors of said first and second sections at the mid-point between said first and second unidirectional magnetic fields for providing a detection signal in the presence of tramp metal adjacent said first or second unidirectional magnetic fields and further providing substantial cancellation of spurious magnetic field responses.

8. The apparatus as described in claim 1, wherein the harvesting machine includes a frame adapted to travel across a field, means mounted to the frame for delivering crop material from the field to said frame, means positioned rearwardly of the delivering means and mounted on said frame for processing the crop material delivered to said frame, and means operably associated with the processing means and positioned between said delivering means and said processing means to compress said crop material and wherein aid static magnetic field detector means is positioned within said compressing means.

9. The apparatus as described in claim 1 wherein:

means for generating a magnetic field comprises first and second elongate permanent magnet means of substantially equal strength having substantially parallel poles and disposed such that a first and second unidirectional magnetic fields of the opposite sense are generated in discrete portions of the area in which tramp metal is to be detected, and wherein the magnetic pickup coil means comprises a multiple conductor coil disposed substantially equally in stationary relation within said first and second unidirectional magnetic fields for providing a detection signal in the presence of tramp metal adjacent said first or second unidirectional magnetic fields and further providing substantial cancellation of spurious magnetic field responses.

10. The apparatus as described in claim 9 wherein the harvesting machine includes a frame adapted to travel across a field, means mounted to the frame for delivering crop material from the field to said frame, means positioned rearwardly of the delivery means and mounted on said frame for processing the crop material delivered to said frame, means operably associated with the processing means and positioned between said delivery means and said processing means to compress said crop material and wherein said static magnetic field detector means is positioned within said compressing means.

* * * * *